United States Patent [19]

Stahlecker

[11] 4,106,192

[45] Aug. 15, 1978

[54] SHAFT BEARING ARRANGEMENT

[75] Inventor: Fritz Stahlecker, Josef-Neidhart-Str. 18, D-7341 Bad Überkingen, Germany

[73] Assignees: Fritz Stahlecker; Hans Stahlecker, Germany

[21] Appl. No.: 673,521

[22] Filed: Apr. 5, 1976

[30] Foreign Application Priority Data

Apr. 4, 1975 [DE] Fed. Rep. of Germany ....... 2514734

[51] Int. Cl.² .............................................. F16C 1/24
[52] U.S. Cl. .................................... 308/172; 308/233
[58] Field of Search ................. 308/36, 169, 163, 172, 308/233

[56] References Cited

U.S. PATENT DOCUMENTS

| 357,847 | 2/1887 | McKeldin | 308/169 |
|---|---|---|---|
| 2,556,489 | 6/1951 | Beeker | 308/233 |
| 3,951,479 | 4/1976 | Stahlecker | 308/172 |
| 4,022,008 | 5/1977 | Pimiskern et al. | 308/169 X |

Primary Examiner—Joseph F. Peters, Jr.
Assistant Examiner—Gene A. Church
Attorney, Agent, or Firm—Craig & Antonelli

[57] ABSTRACT

A bearing arrangement for a shaft end which abuts a freely rotatable ball supported by an oscillatable holding fixture. The holding fixture is fashioned as a pin arranged in opposition to the shaft with the pin being fixably clamped at one end, the other end of which is provided with a socket for accommodating the freely rotatable ball.

41 Claims, 8 Drawing Figures

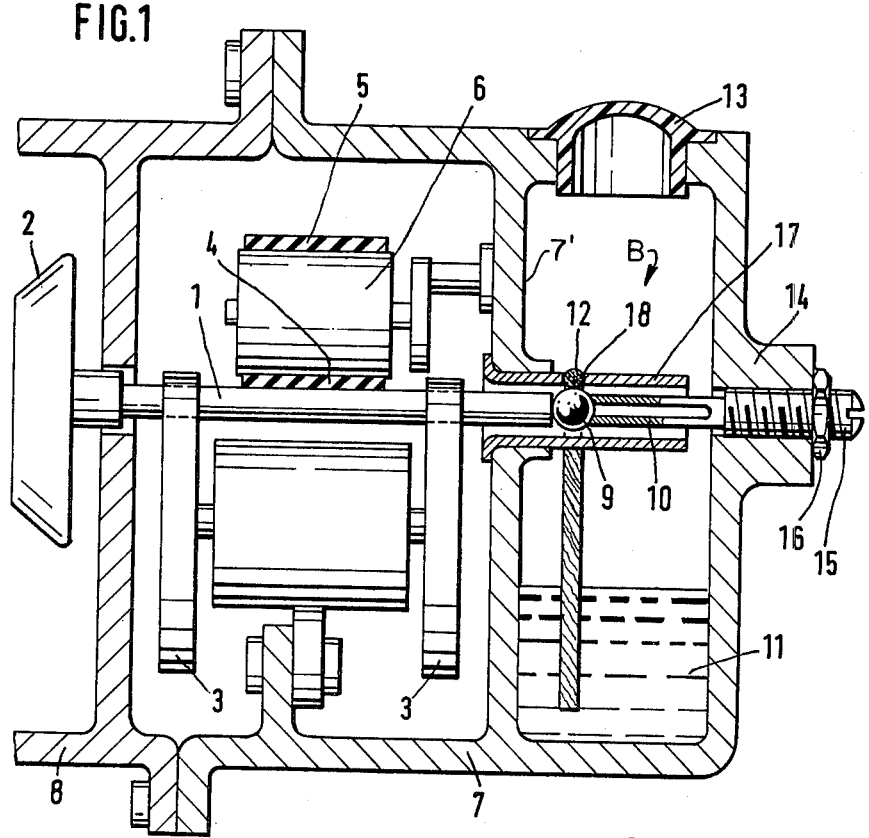
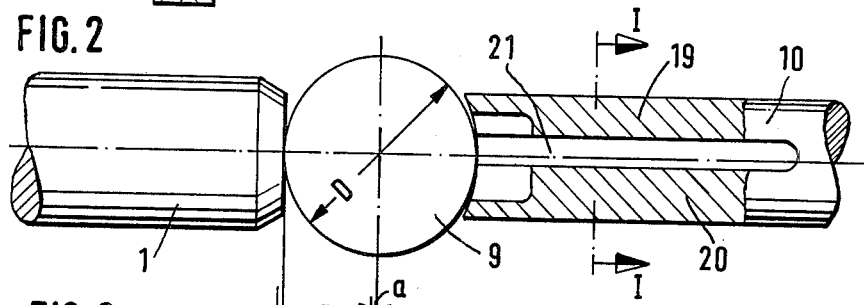
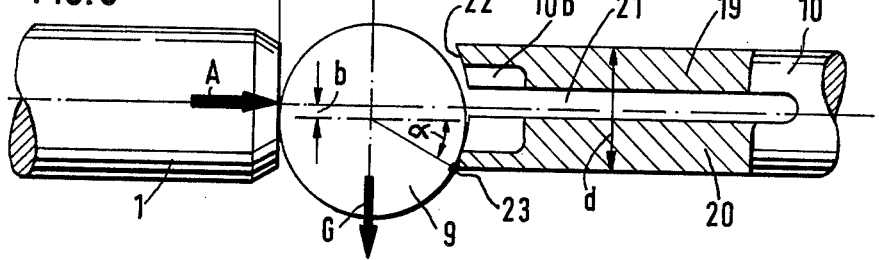

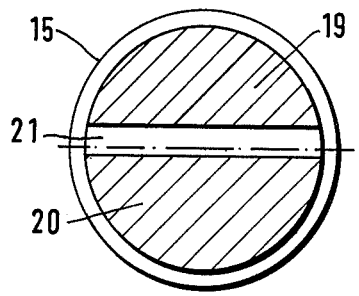
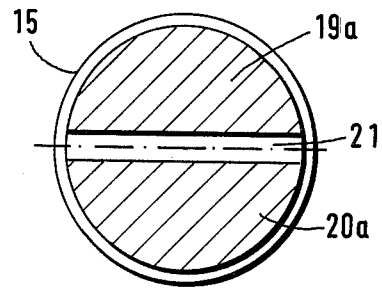
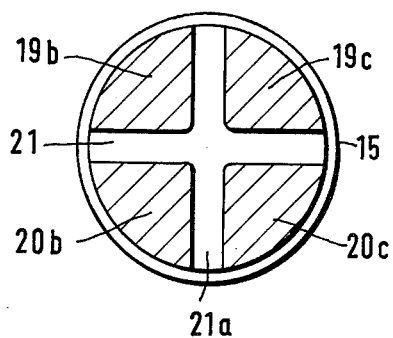
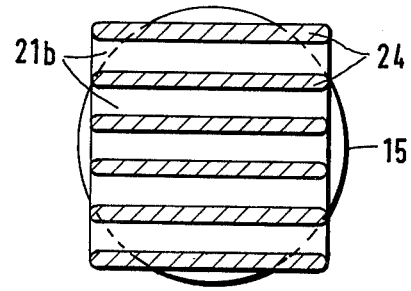
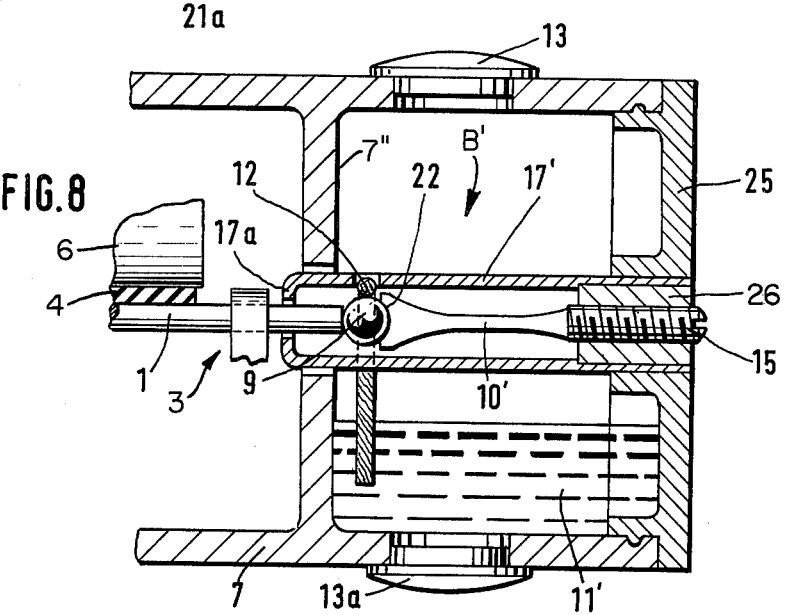

SHAFT BEARING ARRANGEMENT

The present invention relates to a bearing arrangement and, more particularly, to a thrust or step bearing arrangement for an open-end spinning turbine which includes a freely rotatable ball supported by an oscillatable holding fixture with the ball and holding fixture serving as an abutment for a shaft end of the spinning turbine.

To reduce bearing friction between a shaft end or boss of a shaft of a spinning turbine and a footstep bearing, it has been proposed in DOS 2,317,306 corresponding to U.S. Pat. No. 3,951,479 to mount the end of the shaft to abut a ball which is retained by an oscillatable holding fixture. By virtue of this arrangement, the ball has the affect of a reduction bearing since the shaft of the spinning turbine, rotating at a high speed, does not contact a fixed surface, but rather is supported on the ball which serves as a more slowly rotating intermediate member. Also, by virtue of the provision of an oscillating holding fixture, the ball is set into slight vibrations due to the vibrations of the machine which results, for example, from the rotation of the spinning turbine with the shaft or from a tangential belt or similar drive mechanism employed for driving the spinning turbine. Furthermore, by the proposed construction, it is ensured that the ball cannot bind, but rather is in constant rotation.

One disadvantage of the above-noted proposed solution resides in the fact that, by virtue of its construction, it is relatively expensive to manufacture and somewhat difficult to assemble.

The aim underlying the present invention essentially resides in constructing an improved footstep bearing of the aforementioned type. For this purpose, provision is made in accordance with the present invention that the holding fixture for the freely rotatable ball is fashioned as a pin arranged in opposition to an end of the spinning turbine shaft with the pin being fixably clamped on one end only, and with the other end being provided with a socket partially emcompassing and accommodating the ball.

In accordance with one feature of the present invention, the holding pin is provided with at least one longitudinally extending slot by which the oscillating characteristics can be advantageously effected as desired.

In accordance with a further feature of the present invention, the at least one longitudinal slot is mounted asymmetrically with respect to the longitudinal axis of the pin and extends preferably up to the socket, whereby it is possible to subdivide the pin into various sections which have a different natural oscillation characteristic due to the differing moments of inertia. By virtue of this construction, constantly changing supporting or bracing points are provided to the ball so that it can rotate satisfactorily. Moreover, the speed of rotation of the ball itself, which can amount to about 10-200 rpm, is likewise altered with the change in position of the supporting points between the socket and the ball.

In accordance with yet another feature of the present invention, the pin, at least within the area of the socket, is surrounded by a tube-like member which has a diameter which is slightly larger than the ball with the end of the shaft being insertable into the tube, whereby the ball remains in the zone of its retaining or holding fixture even if the turbine shaft should, for any reason, leave or be displaced from its predetermined position.

In accordance with a still further feature of the present invention, a wick or the like of an impregnable material rests on the ball with the wick being immersed in a lubricant bath, whereby the ball is adequately lubricated. Preferably, the wick is formed of a rather hard fabric and may have a diameter of approximately 6 mm. By virtue of this latter feature, the ball is somewhat braked; however, it has been found that, by such feature, the speeds of the balls at the various spinning stations may more readily be made uniform.

In accordance with a further feature of the present invention, an additional weighting component may be provided at the lower area of the wick whereby the wick is weighted down, thereby preventing a lifting-off or displacement of the wick from the ball.

Still another feature of the present invention resides in mounting the pin so as to be adjustable in the axial direction, whereby it is possible to then adjust the exact position of the spinning turbine by way of the footstep bearing.

A still further feature of the present invention resides in combining the pin, tube and ball into a single structural unit, whereby a single module results, thereby facilitating an easy mounting while simplifying the placement of the step bearing at the spinning machine without requiring complicated operations for this purpose or a considerable down time of the spinning machine.

Accordingly, it is an object of the present invention to provide a bearing arrangement which avoids, by simple means, the afore-mentioned shortcomings and drawbacks encountered in the prior art.

Another object of the present invention resides in providing a bearing arrangement which includes a freely rotatable and oscillatably held ball constructed in such a manner that a solution is obtained which is advantageous from the viewpoints of manufacture and assembly.

Still another object of the present invention resides in providing a bearing arrangement which satisfies all necessary requirements and provides a maximum lifetime.

A still further object of the present invention resides in a bearing arrangement which essentially consists of a few, readily mountable components and which requires no complicated configuration, thereby rendering the components easy to manufacture.

Another object of the present invention resides in providing a footstep bearing with a freely rotatable and oscillatably held ball, wherein sufficient lubrication of the ball is ensured.

A still further object of the present invention resides in providing a bearing arrangement for a shaft, whereby it is possible to adjust the exact positioning of the shaft.

These and other objects, features and advantages of the present invention will become more apparent from the following description when taken in connection with the accompanying drawing which shows, for the purposes of illustration only, several embodiments in accordance with the present invention, and wherein:

FIG. 1 is a partial cross-sectional side view of a bearing arrangement in accordance with the present invention;

FIG. 2 is a partial cross-sectional view on an enlarged scale of the ball and holding fixture construction of FIG. 1;

FIG. 3 is a partial cross-sectional view of the elements of FIG. 2 in a different operating position;

FIG. 4 is a cross-sectional view taken along the line I—I of FIG. 2;

FIGS. 5–7 are cross-sectional views similar to FIG. 4 of additional embodiments in accordance with the present invention; and FIG. 8 is a partial cross-sectional side view through a further embodiment of a bearing arrangement in accordance with the present invention.

Referring now to the drawings, wherein like reference numerals are used throughout the various views to designate like parts, and more particularly to FIG. 1, according to this figure, a shaft 1 of an open-end spinning turbine 2 is supported in a V-shaped slot formed by two guide roller pairs 3 in the radial direction. The shaft 1 is secured in the slot in the radial direction by way of tangential belt 4 which directly engages the shaft 1. The tangential belt 4 is pressed against the shaft 1 with the aid of a pressure roller 6 on which the returning side 5 of the tangential belt 4 is directly returned. The guide roller pairs 3 and the tangential belt 4 along with the pressure rollers 6 are disposed in a duct or compartment formed by two housing elements 7, 8 which, for example, may be fashioned as extruded profiles.

The shaft 1 is axially supported at its end opposite to the spinning turbine 2 by way of a bearing generally designated by the reference character B. Axial thrust exerted on the shaft 1 by the guide roller pairs 3 and/or by the tangential belt 4 due to an oblique positioning or the like, is absorbed by the bearing B.

The bearing B includes a freely rotatable ball 9 with the end of the shaft 1 being supported against and engaging the ball. The ball 9 is held in its operative position by way of a pin 10 arranged at a diametrically opposite position with respect to the shaft 1. The pin 10 is clamped or otherwise secured at only one end thereof with the clamping occurring at a relatively large distance away from the ball 9; e.g., four or five times larger than the diameter of the ball 9.

A wick 12 of impregnable material, preferably a hard fabric or a felt, is immersed in a lubricant bath 11 with a portion of the wick 12 resting on the ball 9 to supply the ball with lubricant, such as oil, by way of the capillary effect. The lubricant bath 11 is accommodated in a chamber of the housing portion which is closed off or sealed by way of a plug or seal 13.

The pin 10 is provided with a threaded lug 15 at its clamped end by means of which the pin 10 is adjustable threadably inserted into a collar 14 having a corresponding internal thread. A lock nut 16 is screwed onto the lug 15 to thereby secure the pin in a desired adjusted position.

The ball 9 and the pin 10 are surrounded by a tube 17 inserted into a rear wall 7' of the housing portion 7 with the tube having an internal diameter which is slightly larger than the diameter of the ball 9. The inner diameter of the tube 17 is also larger than the diameter of the shaft 1 so that the shaft can be introduced into the tube with a certain amount of play.

A recess 18 is arranged in the top zone of the tube 17 above the ball in order to make it possible for the wick 12 to rest on the ball 9. The provision of the tube 17 ensures that the ball 9 cannot escape from the zone of the holding fixture or pin 10 even if, for some reason, the shaft 1 of the spinning turbine 2 should be moved in a direction away from the ball 9. In the embodiment of FIG. 1, the ball 9 preferably has a somewhat larger diameter D than the cross-section of the cylindrical shaft 1.

As shown most clearly in FIGS. 2 and 3, the end of the pin facing the ball 9 is fashioned as a socket having the configuration of a spherical indentation 22. A recess 10b is provided in the central area of the socket so that the spherical indentation has an annular shape. The radius of the spherical indentation 22 is slightly larger than the radius of the ball 9 so that a flat contact is avoided. For example, if the radius of the ball is 6 mm, then the radius of the spherical indentation would suitably be made to be 6.25 mm. These dimensional configurations ensure that the ball 9 is supported along a circular line. Advantageously, the ball 9 as well as the spherical indentation is provided with a hardened surface.

As also shown in FIGS. 2 and 3, the pin 10 is disposed exactly diametrically opposite the end of the shaft 1 with the longitudinal axis of the shaft 1 being in alignment with the longitudinal axis of the pin 10. The pin 10 is subdivided into two finger-like sections or extensions 19, 20 by means of a longitudinal slot 21 extending into the zone of the spherical indentation 22. The longitudinal slot 21 is located somewhat asymmetrically with respect to the longitudinal axis or center of the pin 10 so that the sections or extensions 19, 20 have differing cross-sections and, consequently, differing natural oscillation frequencies.

FIG. 3 provides an exaggerated illustration of the same axial displacement movement $a$ executed by the shaft 1 under the effects of an axial thrust A in a direction toward the ball 9. Since the inherent weight G of the ball 9 is directed perpendicular to the direction of the axial thrust A, the ball 9 then executes a rolling motion having a magnitude $b$ on the end face of the shaft 1. Due to this movement, the ball 9 is displaced from its original position in the spherical indentation (FIG. 2) and then rests, for example, along the zone 23 of the spherical indentation 22. To prevent the ball 9 from moving entirely out of the range of the spherical indentation 22, the outer diameter of the pin 10 in the zone of the spherical indentation 22 is adapted for accommodating the possible axial movements of the shaft 1. Since the axial movements, illustrated in an exaggerated fashion in FIG. 3, are merely in the micron range, it is generally sufficient to provide the pin in the region of the spherical indentation with an outer diameter $d$ of about 0.4–0.7 mm of the ball diameter D.

The inherent weight G of the ball 9 multiplied by the tangent of the angle $\alpha$ subtended between the supporting point 23 and the axis of the shaft 1 counteracts the axial thrust A. Since the inherent weight of the ball 9 lies in the range of about 4–8 grams and the axial thrust A, under practical conditions, will hardly be smaller than 300 grams, the effect of the inherent weight of the ball 9 does not have an adverse influence on the axial thrust A.

Due to the displacement of the ball 9 from the central position illustrated in FIG. 2, the ball 9 comes into contact with a zone of the end face of shaft 1 which is rotating at a relatively high peripheral speed so that the ball 9 is set into rotation. The displacement of the ball 9 is also produced by the oscillations of the pin 10. Since the finger-like sections or extensions 19, 20 move independently of each other and also with respect to each other, especially in the zone of the spherical indentation 22, different respective supporting points come into play in the zone of the spherical indentation 22 so that the ball 9 will execute motions in all possible directions and at varying speeds. Thus, practically the entire outer surface of the ball 9 is utilized as a bearing surface by virtue of the construction of the present invention.

The oscillating characteristics of the pin 10 can readily be predetermined by its configuration. Thus, it is possible to determine durations of oscillation by specific shapes of the pin and thereby determine the natural frequencies. In the construction of FIGS. 2-4, the preferred direction of oscillation of the finger-like sections or extensions 19, 20 is oriented at right angles to the longitudinal slot 21, wherein the finger-like sections or extensions 19, 20 vibrate in the manner of the tines of a tuning fork. However, since the longitudinal slot 21 is located somewhat asymmetrical with respect to the longitudinal axis of the pin in the embodiment of FIGS. 2-4, the resulting differing cross-sections of the finger-like sections or extensions 19, 20 results in the respective extensions 19, 20 having different natural oscillations so that they are respectively excited by differing machine oscillations.

In the construction of FIG. 5, the longitudinal slot 21 coincides with the longitudinal axis or center of the pin 10 so that the two finger-like sections or extensions 19a, 20a are formed, which extensions are excited to oscillations at the same frequencies.

As shown in FIG. 6, a rectangularly extending longitudinal slot 21a may be provded in addition to the slot 21 so that four finger-like sections or extensions 19b, 19c, 20b, 20c are produced, each having the cross-section of a circular sector. The preferred oscillation directions of the respective extensions 19b-20c are located so that they are radially offset by 90° with respect to one another.

As shown in FIG. 7, the pin 10 may have a substantially square cross-sectional configuration at least in a zone between its threaded portion 15 and the spherical indentation 22. In the square zone, the pin 10 has mutually parallel longitudinal slots 21b which results in the provision of individual webs 24 provided at regular intervals with each web having the same cross-sectional configuration. In this construction, the preferred direction of oscillation is in the direction wherein the webs 24 have the smallest expansion. It is readily possible in accordance with the present invention to extend the pin 10 of FIG. 7 with its square cross-section up to the spherical indentation 22 so that the spherical indentation 22 and the adjoining recesses 10b are incorporated into the square cross-section. Additionally, in many cases, it may be sufficient simply to provide a bore in the pin 10 with the ball 9 partially entering the bore and resting on the rim. In such a construction, preferably the rim of the bore is chamfered creating the shape of a spherical indentation.

As shown in FIG. 8, a step bearing generally designated by the reference character B' is provided which includes a pin 10' which tapers in a zone adjoining the threaded portion 15 in the manner of an expansion screw and then passes over into a thickened portion provided with a spherical indentation 22. The oscillatory behavior of the pin 10' can be predictably effected by the configuration of the relatively long zone between the threaded portion 15 and the spherical indentation 22.

In contrast to the above-discussed embodiments, in the embodiment of FIG. 8, the spherical indentation 22 of the pin 10' oscillates as a whole so that the ball 9 is provided with an identical support on the oscillating pin 10' under any operating condition. In this construction, the pin 10', excitable to oscillations, the ball 9, and the tube 17', together with a lid 25 inserted into the housing 7, for example, by being clipped therein so as to form a detachable module which can be readily mounted and replaced as a unit.

A threaded bushing 26 is pressed into the tube 17', which tube is removably pressed into the lid 25. The pin 10 is threadably inserted into the threaded bushing 26 with its threaded portion 15. In the installed condition, the opposite end of the tube 17' projects beyond the end of the shaft 1 which is receivable in the tube 17'. The end of the tube has a collar or flange-type oversection 17a of such a size that, although the shaft 1 can be introduced, the ball 9, which is of a larger diameter than the shaft 1, cannot be displaced out of the tube 17' even if, for some reason, the shaft 1 of the spinning turbine should move away from the ball 9.

As also shown in FIG. 8, the lubricant bath 11' is accommodated in a separate duct-like chamber of the housing portion 7 which is separated by the back wall 7" from the area receiving the guide roller bearing means 3 and drive means 4. The upper and lower walls of the chamber defining the lubricant bath 11' are provided with at least one plug 13 for supplying the lubricant to the chamber and a plug 13a for discharging the lubricant therefrom.

It is also possible in accordance with the present invention to construct a lubricant bath so that it forms a single structural unit with the bearing, whereby the oscillatable pin 10 or 10', the ball 9, and the tube 17 or 17' may be utilized for one spinning station with the so-formed unit being flanged directly to the rear of the walls 7' or 7" of the housing part 7.

The advantage of the above-described embodiment resides in the fact that, in spite of all the oscillations of the pin 10 or 10', as well as the shaft 1 of the spinning turbine, contact is constantly maintained by way of the ball 9 between the end of the shaft 1 and the pin 10 or 10' by which the axial thrust is transmitted. This construction has the further advantage that none of the oscillations can lead to certain stresses on the individual parts.

While I have shown and described several embodiments in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A bearing arrangement for a shaft connected to a spinning turbine of an open-end spinning unit, the arrangement comprising:
   a ball means,
   an oscillatable holding means for freely rotatably holding said ball means in an abutting relationship with an end of the shaft, said holding means extending generally in the direction of the shaft rotational axis,
   means for fixedly clamping only a first end of said holding means to a relatively fixed member, and
   accommodating means provided at a free end of said holding means, opposite said first end, for at least partially accommodating said ball means, said accommodating means being formed as a socket partially encompassing the ball means, wherein the end of the shaft abutting said ball means is configured without socket means and in such a manner as to permit radial displacement of said ball means from its central position with respect to said end of the shaft, whereby said ball means can be moved by said oscillatable holding means to enhance utilization of the ball means as a bearing surface.

2. An arrangement according to claim 1, wherein said holding means is a pin member having a longitudinal axis disposed in alignment with a longitudinal axis of the shaft.

3. An arrangement according to claim 2, wherein said pin member is provided with at least one longitudinal slot.

4. An arrangement according to claim 3, wherein said longitudinal slot is arranged asymmetrically with respect to the longitudinal axis of the pin member.

5. An arrangement according to claim 4, wherein said longitudinal slot extends from said socket toward said clamping means along a predetermined length of said pin member.

6. An arrangement according to claim 5, wherein said socket is formed as a spherical indentation.

7. An arrangement according to claim 6, wherein said spherical indentation has a radius which is slightly larger than the radius of said ball means.

8. An arrangement according to claim 7, wherein a central area of said spherical indentation is recessed.

9. An arrangement according to claim 8, further comprising retaining means for retaining said ball means at said pin member when the shaft is removed.

10. An arrangement according to claim 9, wherein said retaining means includes a hollow tubular member surrounding at least the area of said spherical indentation, the shaft being removably inserted into said hollow tubular member.

11. An arrangement according to claim 10, wherein said hollow tubular member has a diameter which is slightly larger than the diameter of the ball means.

12. An arrangement according to claim 11, further comprising lubricating means for lubricating said ball means.

13. An arrangement according to claim 12, wherein said lubricating means includes a wick means, means for mounting at least a portion of said wick means at said ball means, and means for supplying a lubricating medium to said wick means.

14. An arrangement according to claim 13, wherein said wick means is formed of an impregnable material.

15. An arrangement according to claim 14, wherein said lubricant medium supply means is a lubricating bath.

16. An arrangement according to claim 15, wherein means are provided for axially adjusting said pin member.

17. An arrangement according to claim 16, wherein said pin means, said hollow tubular body, and said ball means are fashioned into a single structural unit.

18. An arrangement according to claim 1, wherein said holding means is a pin member including a first portion having a first cross-sectional dimension provided at said clamping means, a second portion having a second cross-sectional dimension provided at said accommodating means, and a tapering third portion interconnecting said first portion and said second portion.

19. An arrangement according to claim 18, wherein said accommodating means for at least partially accommodating said ball means is formed as a socket partially encompassing the ball means.

20. An arrangement according to claim 19, wherein said socket is formed as a spherical indentation.

21. An arrangement according to claim 20, wherein said spherical indentation has a radius which is slightly larger than the radius of said ball means.

22. An arrangement according to claim 21, wherein a central area of said spherical indentation is recessed.

23. An arrangement according to claim 22, further comprising retaining means for retaining said ball means at said pin member when the shaft is removed.

24. An arrangement according to claim 23, wherein said retaining means includes a hollow tubular member surrounding at least the area of said spherical indentation, the shaft being removably inserted into said hollow tubular member.

25. An arrangement according to claim 24, wherein said retaining means further includes a flanged-over collar section at one end thereof for limiting the displacement of said ball means in said hollow tubular member.

26. An arrangement according to claim 25, wherein said hollow tubular member has a diameter which is slightly larger than the diameter of the ball means.

27. An arrangement according to claim 26, further comprising lubricating means for lubricating said ball means.

28. An arrangement according to claim 27, wherein said lubricating means includes a wick means, means for mounting at least a portion of said wick means at said ball means, and means for supplying a lubricating medium to said wick means.

29. An arrangement according to claim 28, wherein said wick means is formed of an impregnable material.

30. An arrangement according to claim 29, wherein means are provided for axially adjusting said pin member.

31. An arrangement according to claim 30, wherein said pin means, said hollow tubular body, and said ball means are fashioned into a single structural unit.

32. An arrangement according to claim 3, wherein a longitudinal axis of said longitudinal slot is arranged so as to coincide with the longitudinal axis of said pin member and the longitudinal axis of the shaft.

33. An arrangement according to claim 32, wherein said longitudinal slot extends from said socket toward said clamping means along a predetermined length of said pin member.

34. An arrangement according to claim 2, wherein said pin member is provided with at least two longitudinal slots arranged so as to extend substantially at a right angle with respect to each other such that said pin member is divided into four sectors.

35. An arrangement according to claim 34, wherein each of said longitudinal slots extends from said socket toward said clamping means along a predetermined length of said pin member.

36. An arrangement according to claim 2, wherein said pin member has a square cross-sectional configuration at least in the area of said socket, and wherein a plurality of mutually parallel longitudinal slots are provided in said pin member at least at said cross-sectional configuration, a plurality of web means being defined at regular intervals between adjacent longitudinal slots.

37. An arrangement according to claim 36, wherein each of said plurality of longitudinal slots extends from said socket toward said clamping means along a predetermined length of said pin member.

38. An arrangement according to claim 18, wherein said holding means is a pin member having a longitudinal axis disposed in alignment with a longitudinal axis of the shaft.

39. An arrangement according to claim 38, wherein said pin member is provided with at least one longitudinal slot.

40. An arrangement according to claim 2, wherein said holding means is a pin member including a first portion having a first cross-sectional dimension provided at said clamping means, a second portion having a second cross-sectional dimension provided at said accommodating means, and a tapering third portion interconnecting said first and second portions.

41. An arrangement according to claim 40, wherein said means for at least partially accommodating said ball means is formed as a socket partially encompassing said ball means.

* * * * *